United States Patent
Dong et al.

(10) Patent No.: US 6,861,015 B2
(45) Date of Patent: Mar. 1, 2005

(54) METHOD OF INTEGRALLY FORMING LIGHT-GUIDE AND POLARIZER

(75) Inventors: Chris Dong, Miao-Li Hsien (TW); Kelly Wei, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 314 days.

(21) Appl. No.: 10/063,910

(22) Filed: May 23, 2002

(65) Prior Publication Data

US 2003/0016314 A1 Jan. 23, 2003

(30) Foreign Application Priority Data

Jul. 20, 2001 (TW) .................................. 90117786 A

(51) Int. Cl.$^7$ .............................................. B29D 11/00
(52) U.S. Cl. ...................................... 264/1.34; 264/1.7
(58) Field of Search ........................ 264/1.1, 2.5, 1.7, 264/1.9, 1.31, 1.32, 1.24, 1.34; 425/808; 349/65

(56) References Cited

U.S. PATENT DOCUMENTS 6,132,652 A * 10/2000 Higuchi et al. .............. 264/1.7

* cited by examiner

*Primary Examiner*—Mathieu D. Vargot
(74) *Attorney, Agent, or Firm*—Jianq Chyun IP Office

(57) ABSTRACT

A method of integrally forming light-guide board and polarizer. A polarizer and a mold with a first space and a second space are provided. The polarizer is fixed in the first space. A light-guide material is injected into the second space. By curing the light-guide material, a light-guide board is formed, and the polarizer and the light-guide are integrated together.

19 Claims, 2 Drawing Sheets

METHOD OF INTEGRALLY FORMING LIGHT-GUIDE AND POLARIZER

CROSS REFERENCE TO RELATED APPLICATIONS

This application claims the priority benefit of Taiwan application Ser. no. 90117786, filed Jul. 20, 2001.

BACKGROUND OF INVENTION

1. Field of the Invention

The invention relates in general to a method for integrally forming a light-guide board and an optical thin film built in a liquid crystal display (LCD), and more particularly, to a method of integrally forming a light-guide board and a polarizer.

2. Description of the Related Art

In recent years, the liquid crystal display, accompanied with the advancement of electronic devices, has developed widely applied and versatile functions. However, the method for forming the liquid crystal display has become consequently more complicated. Generally speaking, the liquid crystal display can be categorized into three types, the reflective type liquid crystal display, the transmissive type liquid crystal display and the transflective type liquid crystal display.

FIG. 1 shows a light-guide board and a polarizer on a glass substrate of a conventional liquid crystal display. The light-guide board and the polarizer are adhered to each other with an adhesive material. FIG. 2 shows a cross sectional view of FIG. 1.

Referring to both FIGS. 1 and 2, in the conventional liquid crystal display module, the front light comprises a light-guide board 100 and a polarizer 102. The light-guide board 100 and the polarizer 102 are provided as two separate devices. Normally, after the light-guide board 100 and the polarizer 102 are fabricated, an adhesive material 104 is used to adhere the light-guide board 100 and the polarizer 102. The light-guide board 100 has burnishing terminals 100b and 100c, and a pattern surface 100a to result in incident light thereof being emitted more uniformly.

An additional step for adhesive material 104 is required to integrate the light-guide board 100 and the polarizer 102 together. Therefore, not only is the labor cost increased, but also the material cost (the adhesive material). Further, as the light-guide board 100 and the polarizer 102 are attached manually, the automation for mass production cannot be achieved.

SUMMARY OF INVENTION

The major objective of the present invention is to provide a method for integrally forming a light-guide board and an optical thin film, and more particularly, to provide a method for integrally forming a light-guide board and a polarizer to reduce the fabrication cost of a liquid crystal display module.

Another objective of the present invention is to provide a method for integrally forming a light-guide board and an optical thin film, and more particularly, to provide a method for integrally forming a light-guide board and a polarizer to increase the efficiency for forming a liquid crystal display module.

Still another objective of the present invention is to provide a method for integrally forming the light-guide board and the optical thin film, and more particularly, to provide a method for integrally forming a light-guide board and a polarizerto allows for automated mass production.

To prevent disadvantages of the prior art, the present invention provides a method for integrally forming the light-guide board and the optical thin film, and more particularly, to provide a method for integrally forming a light-guide board and a polarizer includes the following steps. A polarizer and a mold are provided. The mold has a first space and a second space. The polarizer is disposed in the first space of the mold. A light-guide material such as a polymer material is injected into the second space of the mold. The method for injecting the light-guide material includes using a lying type injection molding machine, a lying type compression molding machine, a lying type injection compression molding machine, a standing type injection molding machine, a standing type compression molding machine, and a standing type injection compression molding machine. Being injected into the second space of the mold, the light-guide material is cured to form a light-guide board. Therefore, the polarizer and the light-guide board are adhered to each other at the same time. The integrated light-guide board and polarizer can be applied to the front light of a liquid crystal display.

Thus the structure with the optical thin film and the light-guide board are constructed integrally without an additional adhering step and material. The fabrication cost is thus greatly reduced.

The integrated structure of the optical thin film and the light-guide board can be formed by injection molding, compression molding or injection compression molding methods to omit the step of adhering the optical and the light-guide board, and thus the fabrication time is reduced.

The above method for forming the integrated structure of the polarizer and the light-guide board uses injection molding method, compression molding method or injection compression molding method to achieve the objective of automated mass production.

Both the foregoing general description and the following detailed description are exemplary and explanatory only and are not restrictive of the invention, as claimed.

DETAILED DESCRIPTION

Figure 1:
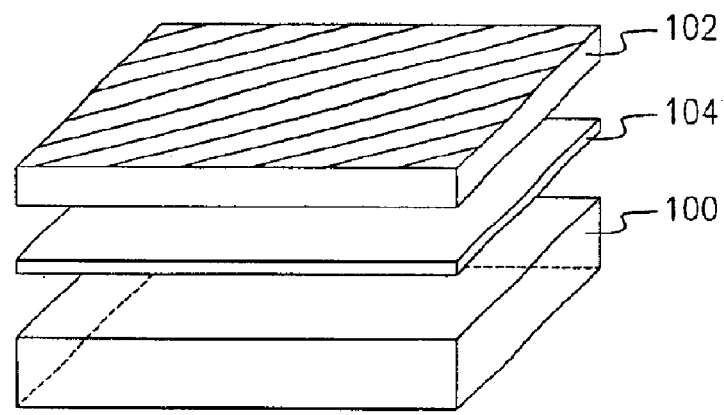
FIG. 1 shows a lateral view of a light-guide board and a polarizer of a conventional liquid crystal display.
Figure 2:
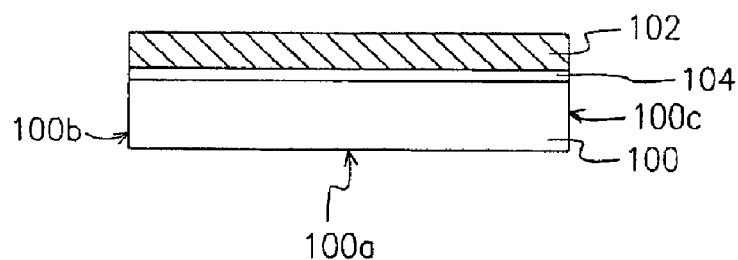
FIG. 2 shows a cross-sectional view of FIG. 1.
Figure 3:
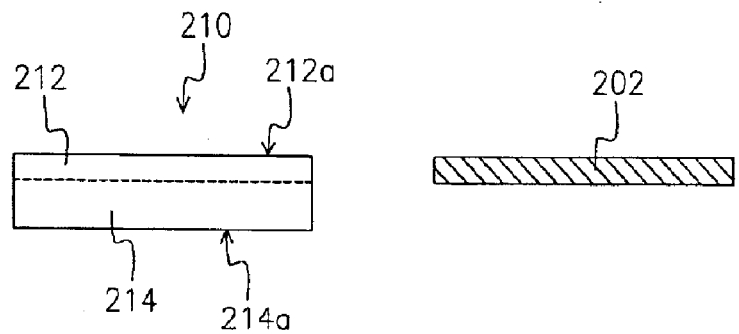
FIG. 3 shows a cross-sectional view of the polarizer and mold according to a preferred embodiment of the present invention.

FIG. 3 shows a cross-sectional view of the polarizer and mold according to a preferred embodiment of the present invention.

As shown in FIG. 3, a mold 210 and a polarizer 202 are provided. It is appreciated that the polarizer 202 is used as an example only, and the invention can also be applied to formation of other optical thin film, such as multi-layer thin film or single-layer thin film. The mold 210 has a first space 212 and a second space 214. The polarizer 202 is disposed into the first space 212 of the mold 210. The first space 212 has a surface 212a, on which no pattern is formed.

For example, using an injection molding method, a melted light-guide material is injected into the second space 214 of the mold 210. Therefore, the polarizer 202 and a light-guide board 200 are formed integrally as in FIG. 4. The molding method further includes compression molding and injection compression molding. The machine applied for the molding process includes a lying type molding machine or a standing type molding machine to inject the light-guide material into the second space 214 of the mold 210. While the lying type machine is used to form the integrated structure 204 of the polarizer 202 and the light-guide board 200, the polarizer 202 is fixed in the first space 212 using a vacuum suction. If a standing type machine is used, gravitation force is directly applied to dispose the polarizer 202 in the first space 212 of the mold 210. The material of the light-guide material includes a polymer, for example. The second space 214 of the mold 210 may have a rugged surface 214a for forming a pattern surface of the light-guide board in the post-process.

Figure 4:
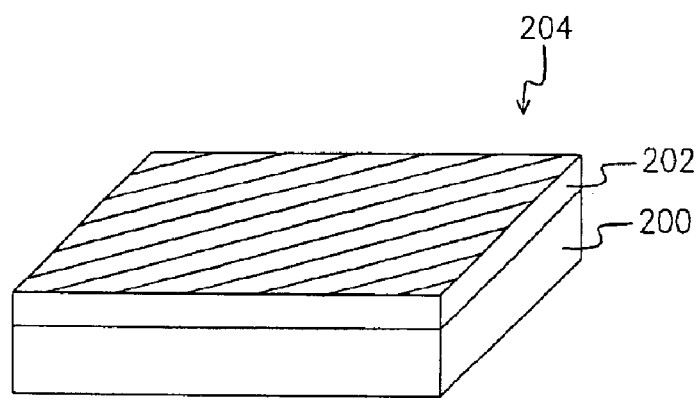
FIG. 4 shows the three-dimensional drawing of the integrated structure according to a preferred embodiment of the present invention.
Figure 5:
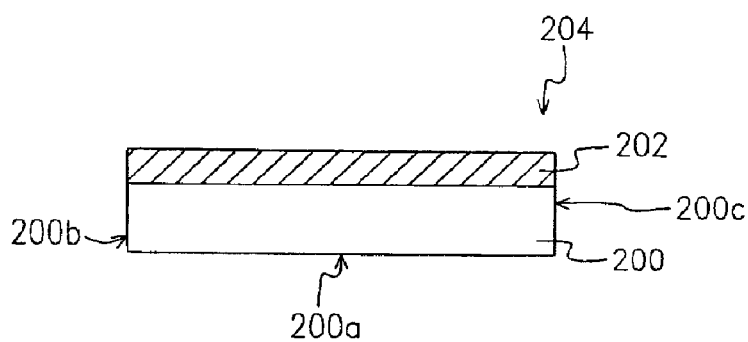
FIG. 5 shows a cross-sectional view of FIG. 4.

FIG. 4 shows the three-dimensional drawing of the integrated structure according to a preferred embodiment of the present invention, and FIG. 5 shows a cross-sectional view of FIG. 4.

Referring to FIGS. 4 and 5, the melted light-guide material is injected into the mold 210 by injection molding method, for example. Then the injected light-guide material in the second space 214 of the mold 210 is cured to become a light-guide board 200. Therefore, an integrated structure 204 including the polarizer 202 and the light-guide board 200 is formed in an integrated structure.

In the embodiment above-mentioned, the light-guide board 200 of the integrated structure 204 has burnishing terminals 200b and 200c and a pattern surface 200a to result in a uniform emission of a light incident thereon. The light-guide board 200 of the integrated structure 204 having the light-guide board and polarizer can be formed by the technology of simultaneous formation after emission, the technology of formation after compressing, the technology of simultaneous formation after emission and compressing, and so on, to be formed on a surface of the polarizer 202. The integrated structure 204 with the light-guide board 200 and the polarizer 202 can be applied as a front light light-guide board.

In the embodiment above-mentioned, the optical thin film, such as polarizer, is disposed in the mold, followed by forming the light-guide board in the mold using injection molding, compression molding or injection compression mold and then an integrated structure is formed. The problems of the conventional method of adhering separated polarizer and light-guide board by using adhesive material are thus resolved. The fabrication cost is thus reduced, the additional attaching step saved, and the automated mass production of liquid crystal display modules is achieved. The invention can be applied to a reflective type liquid crystal display or other types of liquid crystal displays.

The invention includes at least the following advantages:

1. By integrally forming the polarizer and the light-guide board, an additional adhering step for adhesive material is saved to reduce the fabrication cost.

2. Since the integrated structure with the polarizer and the light-guide board are formed using injection molding, compression molding or injection compression molding, and an additional adhering step is omitted and the fabrication time is reduced.

3. By using the injection molding, compression molding or injection compression molding to form the integrated structure with the polarizer and the light-guide board, the objective of automated mass production can be achieved.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

What is claimed is:

1. A method of integrally forming an integrated structure of a light-guide board and an optical thin film, comprising:
    providing a mold and the optical thin film comprising at least a polarizer, wherein the mold has a first space and a second space, and the first space has a surface on which no pattern is formed;
    disposing the optical thin film in the first space of the mold; and
    injecting a light-guide material into the second space of the mold.

2. The method according to claim 1, wherein the optical thin film includes a multi-layer thin film.

3. The method according to claim 1, wherein the optical thin film includes a single-layer thin film.

4. The method according to claim 1, wherein mold includes an injection mold, a compression mold and an injection compression mold.

5. The method according to claim 4, wherein the injection molding step uses a lying injection machine.

6. The method according to claim 4, wherein the injection molding step uses a standing injection machine.

7. The method according to claim 1, wherein the light-guide material includes a polymer.

8. A method of integrally forming a structure of a light-guide board and an optical thin film, comprising:
    providing a mold and the optical thin film comprising at least a polarizer,
    disposing the optical thin film on one surface of the mold, wherein the surface has no pattern thereon; and
    injecting a light-guide material in the mold to fill another space without the optical thin film, and curing the light-guide material to form a light-guide board adhered to the optical thin film.

9. The method according to claim 8, wherein the optical thin film includes a multi-layer thin film.

10. The method according to claim 8, wherein the optical thin film includes a single-layer thin film.

11. The method according to claim 8, wherein the mold includes an injection mold, a compression mold and an injection compression mold.

12. The method according to claim 11, wherein the injection molding step uses a lying injection machine.

13. The method according to claim 11, wherein the injection molding step uses a standing injection machine.

14. The method according to claim 8, wherein the light-guide material includes a polymer.

15. A method of integrally forming a structure with a light-guide board and an optical thin film, comprising:
    disposing the optical thin film comprising at least a polarizer on a first surface of the mold wherein the first surface has no pattern thereon; and
    forming the light-guide board on a second surface opposing to the optical thin film via an injection molding, a compression molding or an injection compression molding step, wherein the second surface has a pattern thereon.

16. The method according to claim 15, wherein the optical thin film includes a multi-layer thin film.

17. The method according to claim 15, wherein the optical thin film includes a single-layer thin film.

18. The method according to claim 15, further comprising using a lying injection machine for forming the light-guide board.

19. The method according to claim 15, further comprising using a standing injection machine for forming the light-guide board.

* * * * *